(12) United States Patent
Matsunaga et al.

(10) Patent No.: US 7,201,995 B2
(45) Date of Patent: Apr. 10, 2007

(54) BATTERY POSITIVE COVER

(75) Inventors: Hideki Matsunaga, Yokkaichi (JP);
Kiyotaka Kawase, Yokkaichi (JP);
Kenichiro Akizuki, Toyota (JP);
Takahiko Kamiya, Toyota (JP)

(73) Assignee: Sumitomo Wiring Systems, Ltd. (JP)

( * ) Notice: Subject to any disclaimer, the term of this patent is extended or adjusted under 35 U.S.C. 154(b) by 491 days.

(21) Appl. No.: 10/734,035

(22) Filed: Dec. 11, 2003

(65) Prior Publication Data

US 2004/0137315 A1 Jul. 15, 2004

(30) Foreign Application Priority Data

Dec. 12, 2002 (JP) ............... 2002-360370

(51) Int. Cl.
*H01M 2/34* (2006.01)
(52) U.S. Cl. ........................ 429/65; 439/522
(58) Field of Classification Search ................ 429/65; 439/522
See application file for complete search history.

(56) References Cited

U.S. PATENT DOCUMENTS 3,544,953 A * 12/1970 Shannon ................ 439/522
5,169,338 A * 12/1992 Dewar et al. ............ 439/522
5,338,898 A * 8/1994 Luciano et al. ......... 429/65 X
5,503,642 A * 4/1996 Lippert et al. .......... 429/65 X
5,925,854 A * 7/1999 Sugiyama ............... 429/65 X
2002/0168566 A1 11/2002 Ohtsuka et al. ............ 429/175

FOREIGN PATENT DOCUMENTS

JP 2001-167810 6/2001
JP 2002-141056 5/2002

OTHER PUBLICATIONS

Computer-generated translation of JP 2002-141056, for the Japanese Patent Office Website (doc date May 2002).*
Computer-generated translation of JP 2001-167810, for the Japanese Patent Office Website (doc date Jun. 2001).*

* cited by examiner

*Primary Examiner*—Stephen J. Kalafut
(74) *Attorney, Agent, or Firm*—Gerald E. Hespos; Anthony J. Casella (57) ABSTRACT

A battery positive cover (20) is provided for a battery terminal and a wire harness. The battery positive cover (20) has inclined portions (36, 38) that can be pressed from an outer side of a sectionally U-shaped wire harness-mounting part (24) toward the inner side thereof. The inclined portions (36, 38) project from opposed facing tips at an entry (24B) of the wire harness-mounting part (24) and incline towards the inner side of the wire harness-mounting part (24). A wall (24C, 24D) of the wire harness-mounting part (24) can be elastically deformed from a holding position to an open position.

11 Claims, 8 Drawing Sheets

BATTERY POSITIVE COVER

BACKGROUND OF THE INVENTION

1. Field of the Invention

The invention relates to a battery positive cover and more particularly to a battery positive cover for covering a battery terminal of a vehicle.

2. Description of the Related Art

Japanese Patent Application Laid-Open No. 2001-167810 discloses a battery positive cover that is used to protect terminal of an electric wire that is connected with a battery terminal. The battery positive cover has a protection part for covering the terminal of the electric wire and a mounting part mounted on the periphery of the electric wire near the terminal. The protection part is made of a soft material, whereas the mounting part is made of a hard material. The protection part and the mounting part are formed integrally. The mounting part has a body with an open surface that is sufficiently large to receive the electric wire. The mounting part also has a cover that is hinged integrally with the body. The cover can be rotated relative to the body to close the open surface of the body so that the electric wire can be held between the body and the cover of the mounting part.

The cover must be opened and closed in a complicated manner to mount the above-described battery positive cover on the periphery of the electric wire near the terminal that will be connected with the battery post. More particularly, the must cover pivot around a hinge, and there is a possibility that the hinged cover will interfere with the body of the battery. Additionally, the cover cannot be closed easily when the operation space is small. Consequently the mounting operation is unfavorable.

The invention has been made in view of the above-described problem. Accordingly, it is an object of the invention to provide a battery positive cover that allows a mounting operation to be performed easily.

SUMMARY OF THE INVENTION

The invention relates to a battery positive cover that includes a terminal protection part for protecting a battery terminal and a wire harness-mounting part. The wire harness-mounting part has an entry that is capable of elastically deforming between a holding position for holding a wire harness inside the wire harness-mounting part and an open position for allowing insertion of the wire harness into the wire harness-mounting part. A moving means is formed on the wire harness-mounting part. The moving means can be pressed from an outer side of the wire harness-mounting part toward an inner side thereof to allow the wire harness-mounting part to move to the open position so that the wire harness can enter the wire harness-mounting part.

The wire harness-mounting part can be deformed elastically from the holding position to the open position by pressing the moving means from the outer side of the wire harness-mounting part toward the inner side thereof. Consequently, the battery positive cover can be opened merely be pressing the moving means against the wire harness. The wire harness then can be inserted into the wire harness-mounting part through the entry. This construction allows the mounting operation to be performed easily.

The wire harness-mounting part preferably has a U-shaped cross-section. The moving means preferably include inclined portions that project at both opposed tips of the entry to the wire harness-mounting part and that align towards the inner side of the wire harness-mounting part.

The inclined portions can be pressed from the outer side of the wire harness-mounting part toward the inner side thereof to deform the wire harness-mounting part elastically from the holding position to the open position. Consequently, the wire harness can be inserted into the wire harness-mounting part merely by pressing the battery positive cover against the wire harness. Accordingly, the battery positive cover has a simple construction and allows the mounting operation to be performed with high efficiency.

The battery positive cover also preferably includes a locking means for holding the entry in a closed state. The locking means can be used by pressing the tips of the entry of the wire harness-mounting part towards one another and into contact. Thus, the locking means hold the entry in the closed state, and hence the battery positive cover is not separated easily from the wire harness.

DETAILED DESCRIPTION OF THE PREFERRED EMBODIMENTS

The battery positive cover of the present invention is described below with reference to FIGS. 1 through 8. The arrows FR, UP, and IN in the drawings respectively indicate the forward direction, the upward direction, and the inner side width direction, all relative to the vehicle body.

Figure 2:
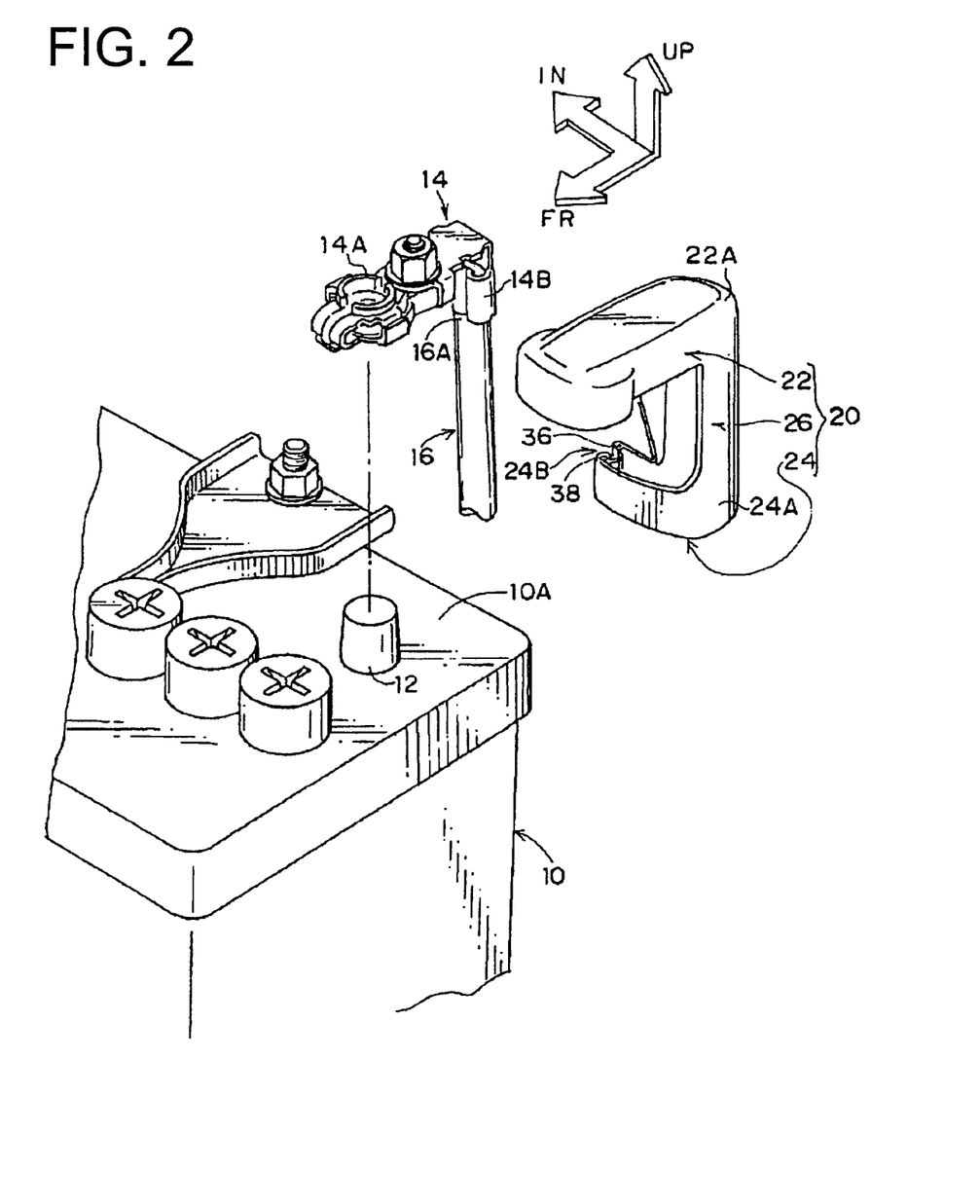
FIG. 2 is an exploded perspective view showing the inside of an engine compartment in which the battery positive cover of the present invention is applied as seen from a position forward from and diagonally to the vehicle body.

As shown in FIG. 2, a battery 10 is disposed in an engine compartment of a vehicle. The battery 10 has an upper surface 10A and a battery post 12 extends up from the upper surface 10A of the battery 10. A battery terminal 14 has opposite front and rear ends 14A and 14B aligned along a front-to-back direction of the vehicle and is mounted on the battery post 12. A wire harness 16 is connected to a rear end 14B of the battery terminal 14 and extends vertically down substantially adjacent the battery 10.

A battery positive cover according to the invention is identified by the numeral 20 in FIGS. 1 through 8. The battery positive cover 20 is made of a resinous material and can be mounted on the battery terminal 14 and an upper end 16A of the wire harness 16.

The battery positive cover 20 includes a terminal protection part 22 that will extend along the front-to-back direction of the vehicle body for protecting the battery terminal 14. The battery positive cover 20 also includes a wire harness-mounting part 24 that will extend along the width direction of the vehicle body. A connection part 26 of the battery positive cover 20 extends between a rear end 22A of the terminal protection part 22 and a closed outer connecting wall 24A of the wire harness-mounting part 24 with respect to the width direction of the vehicle body.

Figure 3:
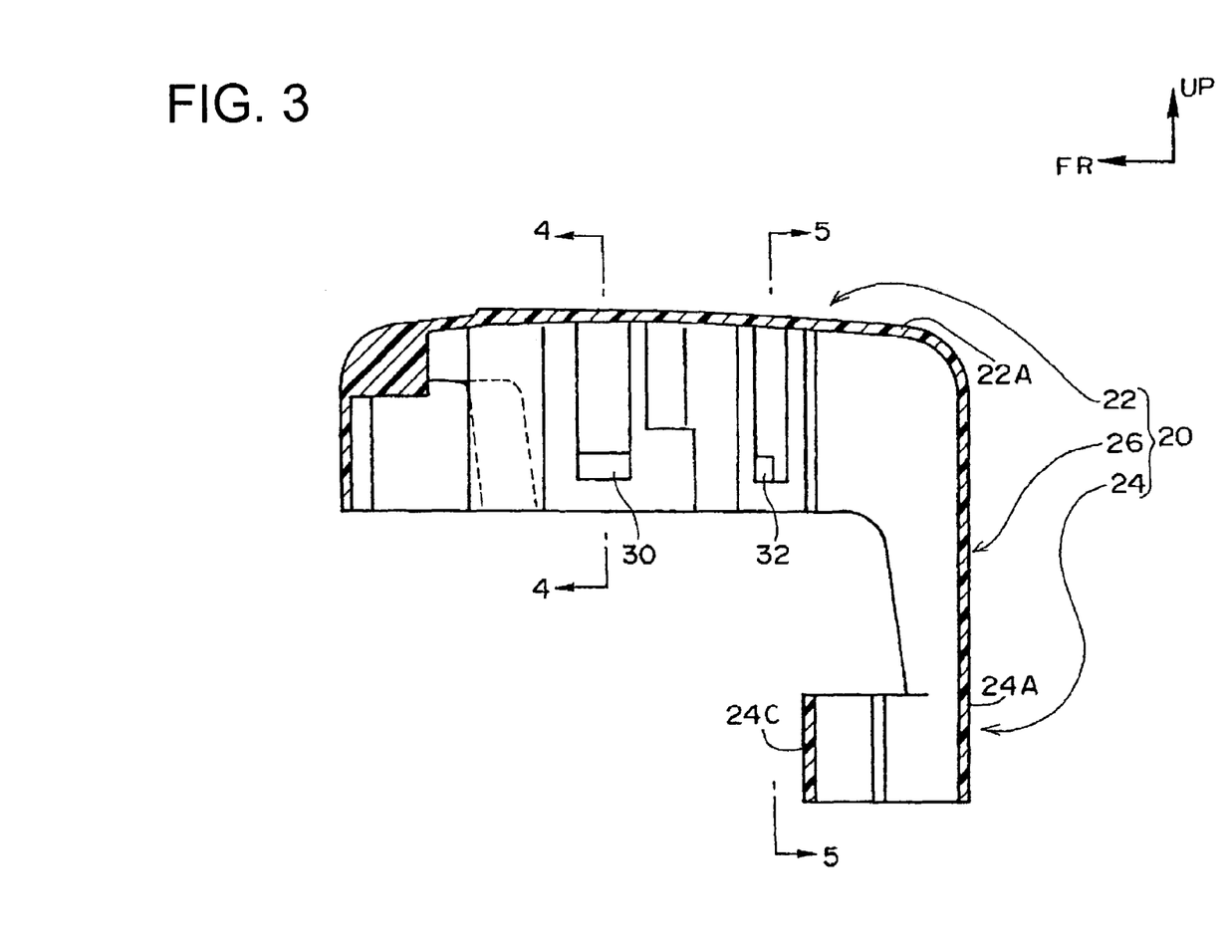
FIG. 3 is a sectional view along a line 3—3 of FIG. 1.
Figure 4:
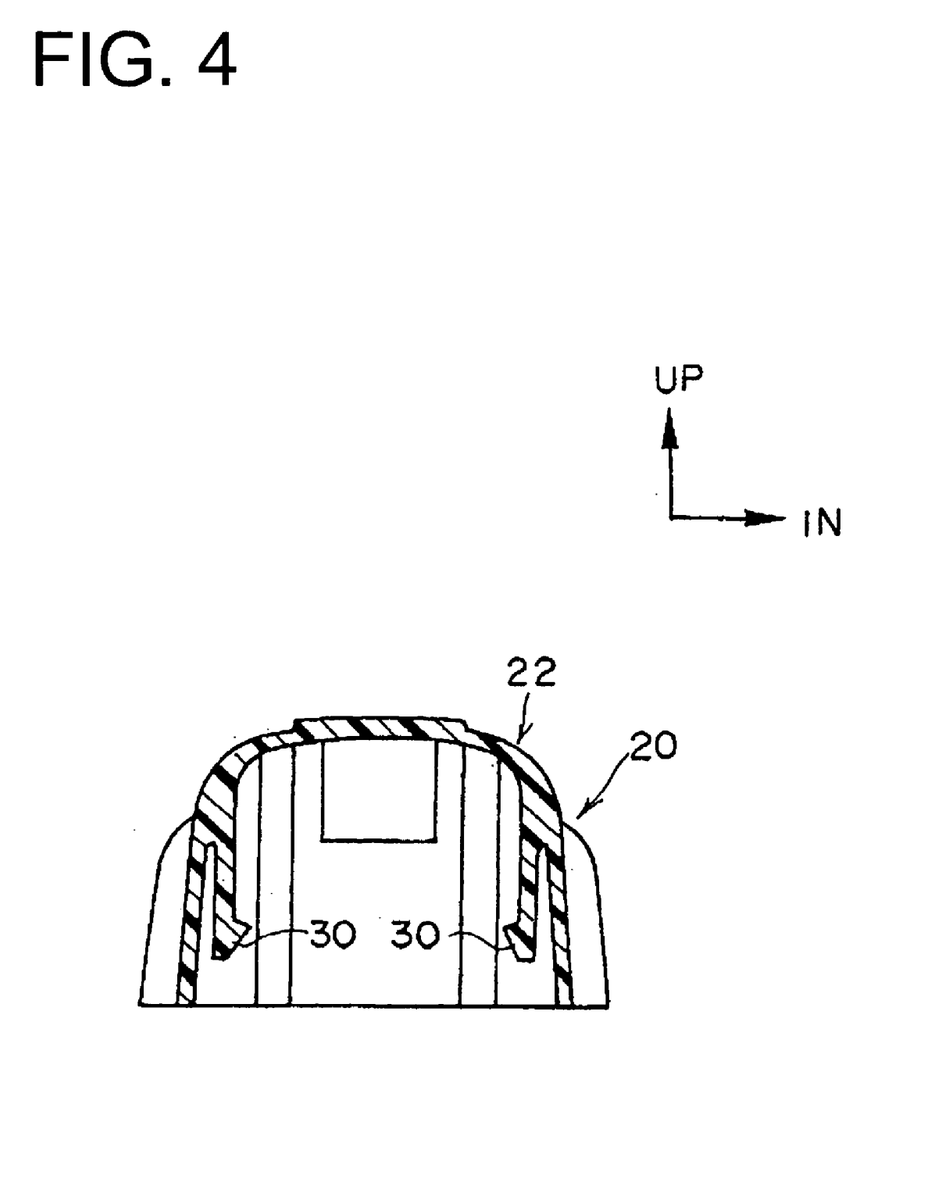
FIG. 4 is a sectional view along a line 4—4 of FIG. 3.
Figure 5:
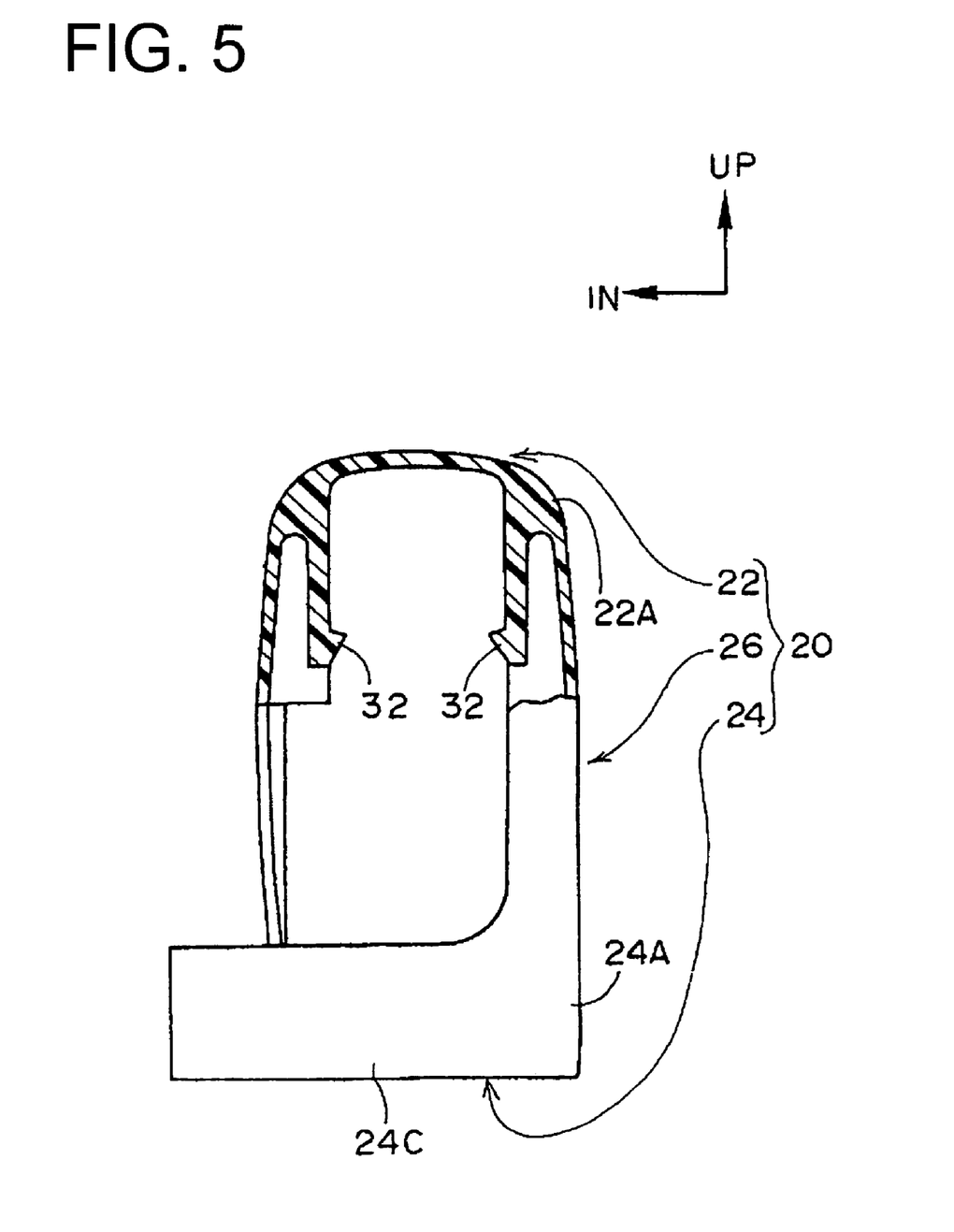
FIG. 5 is a sectional view along a line 5—5 of FIG. 3.

The terminal protection part 22 of the battery positive cover 20 is open at its lower side, as shown in FIG. 3, and has a generally bag-shape dimensioned to cover the battery terminal 14 from above. More particularly, the terminal protection part 22 of the battery positive cover 20 defines a generally inverted U-shape as illustrated in the cross-sections of FIGS. 4 and 5. As shown in FIG. 3, the terminal protection part 22 of the battery positive cover 20 accommodates a first pair of confronting engaging claws 30 and a second pair of confronting engaging claws 32 spaced from the engaging claws 30 in the front-to-back direction of the vehicle body. The engaging claws 30 and 32 are configured to engage the battery terminal 14.

Figure 1:
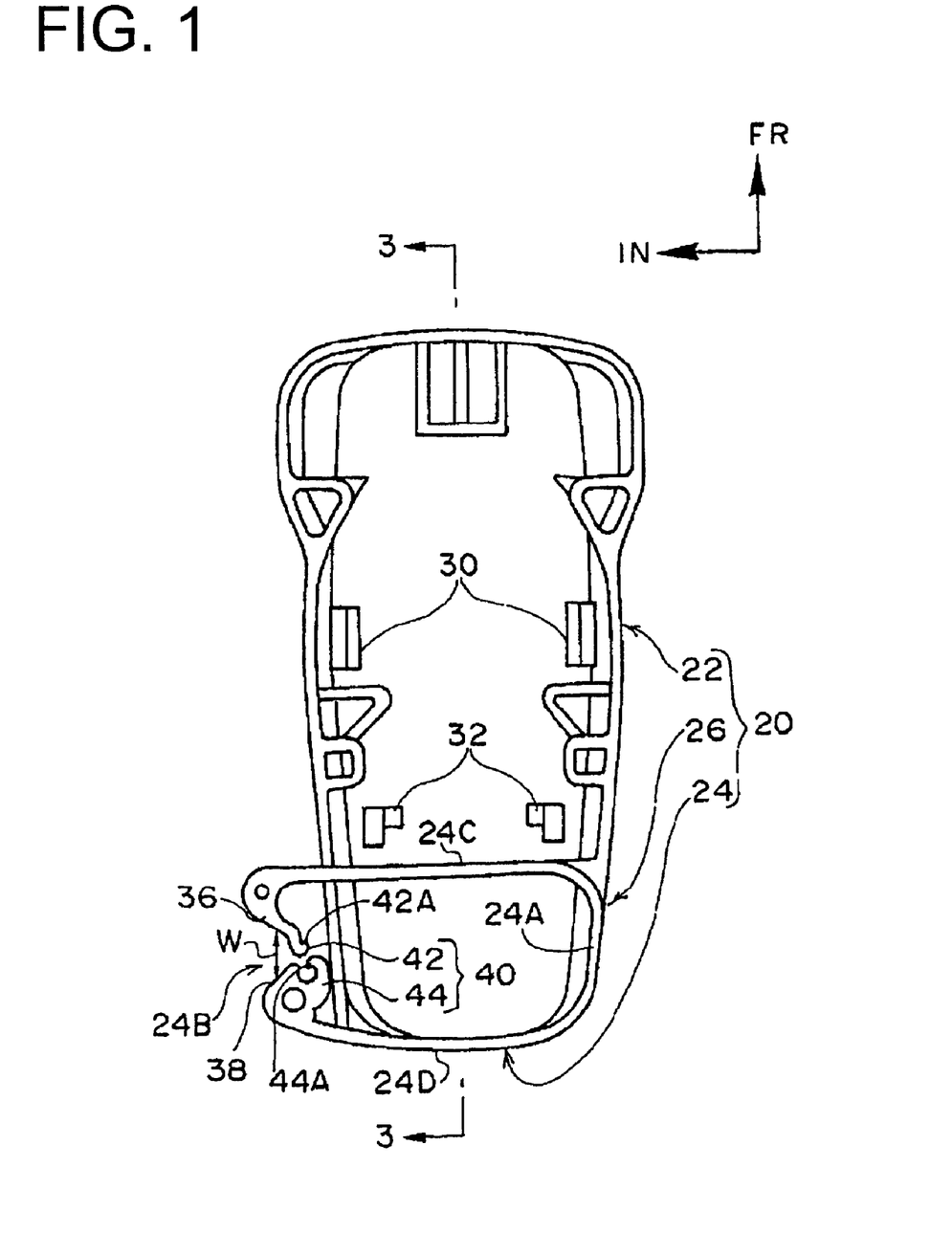
FIG. 1 is a bottom plan view of a battery positive cover in accordance with the present invention.

The wire harness-mounting part 24 of the battery positive cover 20 also is U-shaped, and, as shown in FIG. 1, has an entry 24B opposite the closed outer connecting wall 24A and facing in the direction of the inner side arrow IN. The wire harness-mounting part 24 also has a front wall 24C that is capable of elastically deforming between a holding position for holding the wire harness 16 inside the wire harness-mounting part 24, as shown in FIG. 6C and an open position for allowing insertion of the wire harness 16 into the wire harness-mounting part 24, as shown in FIG. 6B.

The wire harness-mounting part 24 has inclined portions 36 and 38 that project at the opposed tips of the entry 24B, as shown in FIG. 1. The inclined portions 36 and 38 are inclined toward the inner side of the wire harness-mounting part 24. Thus, the interval W between the inclined portions 36 and 38 becomes gradually smaller toward the inner end of the entry 24B of the wire harness-mounting part 24. The inclined portions 36 and 38 function as a moving means, as explained herein.

Figure 6A:
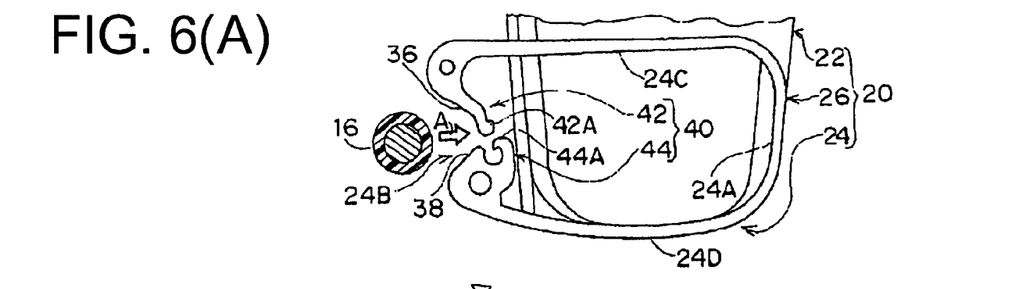
FIGS. 6A through 6D are plan views showing an operation of mounting the battery positive cover.
Figure 6B:
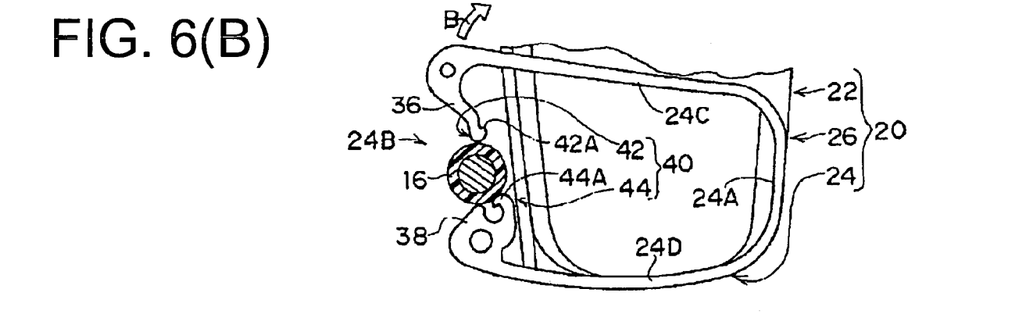

The inclined portions 36 and 38 can be pressed by the wire harness 16 from the outer side of the wire harness-mounting part 24 towards the inner side thereof in the direction of arrow A of FIG. 6A, and hence towards the connecting wall 24A. The pressing force in the direction A deforms the front wall 24C of the wire harness-mounting part 24 elastically out in the direction shown by the arrow B in FIG. 6B and towards the open position. This deformation is around the closed outer wall 24A of the wire harness-mounting part 24.

Figures 6C, 6D:
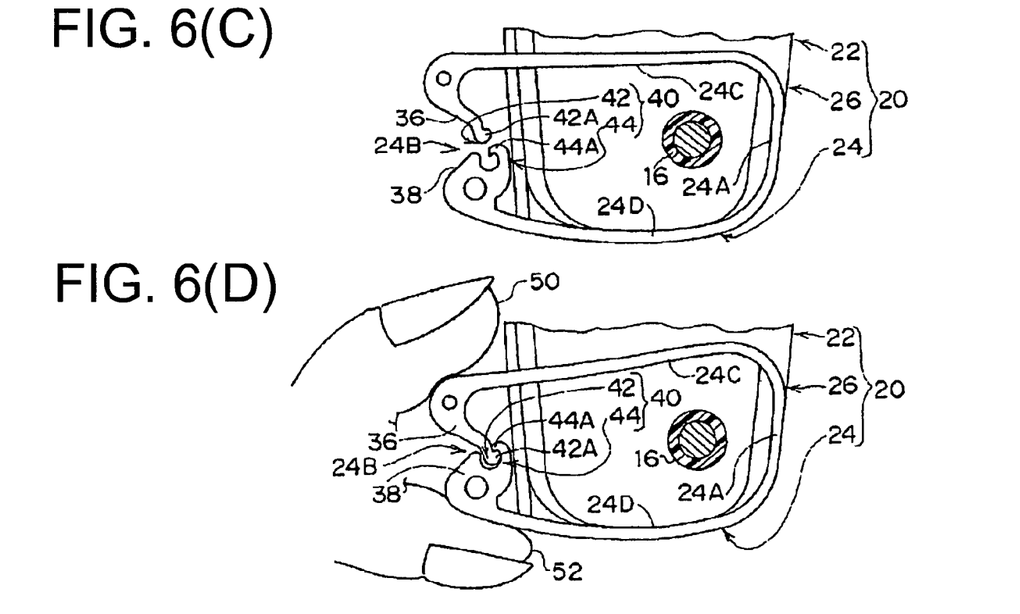

As shown in FIG. 6D, a locking means 40 for holding the entry 24B in a closed state is formed at the tip of each of the inclined portions 36 and 38 of the wire harness-mounting part 24. The locking means 40 has an inner lock 42 with an engaging concavity 42A on the periphery thereof and an outer lock 44 engaging the periphery of the inner locking portion 42 with a tip 44A that is engageable in the engaging concavity 42A. As shown in FIG. 6D, the entry 24B of the sectionally U-shaped wire harness-mounting part 24 can be pressed with fingers 50 and 52 in the direction in which the inclined portions 36 and 38 contact each other. Thus, the inner lock 42 and the outer lock 44 engage and hold the entry 24B in a closed state.

As shown in FIG. 2, the connection part 26 of the battery positive cover 20 has a U-shaped cross-section with an open side facing forward on the vehicle body, as indicted by the arrow FR. The connection part 26 is configured to cover the wire harness 16 from the rear side of the vehicle body.

The battery positive cover 20 is mounted on the battery terminal 14 and the wire harness 16, as shown in FIG. 6A, by pressing the inclined portions 36 and 38 from the outer side of the wire harness-mounting part 24 toward the inner side thereof, as shown by the arrow in FIG. 6A. As described above, the inclined portions 36 and 38 project from both facing tips of the entry 24B of the U-shaped wire harness-mounting part 24 and point toward the closed outer wall 24A of the wire harness-mounting part 24. Thus, the wire harness-mounting part 24 can be deformed elastically from the holding position thereof, as shown in FIG. 6A, to the open position thereof, as shown in FIG. 6B.

The wire harness-mounting part 24 resiliently returns to the holding position shown in FIG. 6C when the wire harness 16 has been inserted into the wire harness-mounting part 24. Thus, the wire harness 16 can be held inside the wire harness-mounting part 24 merely by pressing the battery positive cover 20 against the wire harness 16. That is, the battery positive cover 20 has a simple construction and allows the mounting operation to be performed easily.

The opposed sides of the U-shaped wire harness-mounting part 24 can be pressed towards one another adjacent the opening 24B by fingers 50 and 52, as shown in FIG. 6D. Thus, the inclined portions 36 and 38 contact each other, the inner and outer locks 42 and 44 engage to hold the entry 24B in the closed state. Therefore, the battery positive cover 20 is not removed inadvertently from the wire harness 16.

Figure 7A:
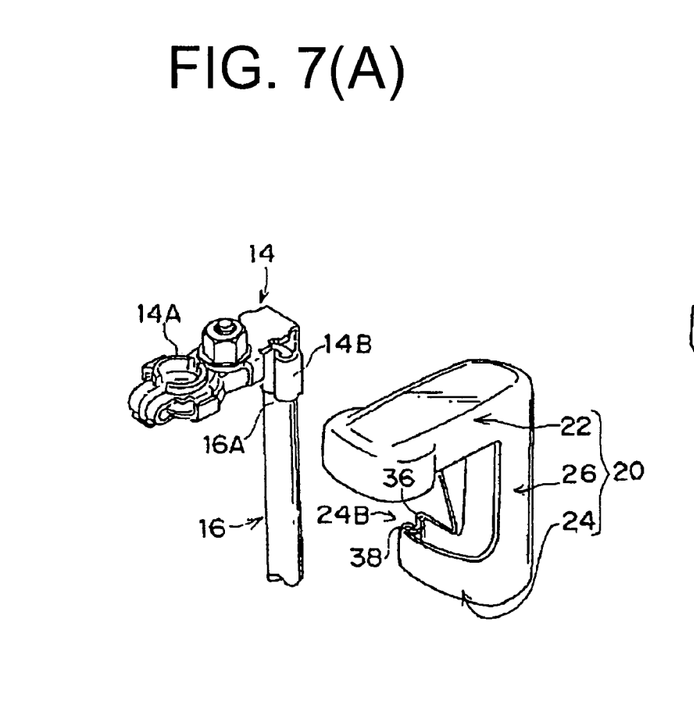
FIGS. 7A through 7C are perspective views showing the operation of mounting the battery positive cover.
Figure 7B:
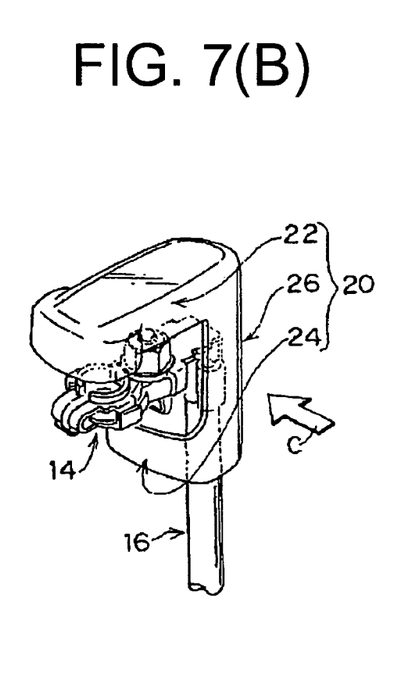
Figure 7C:
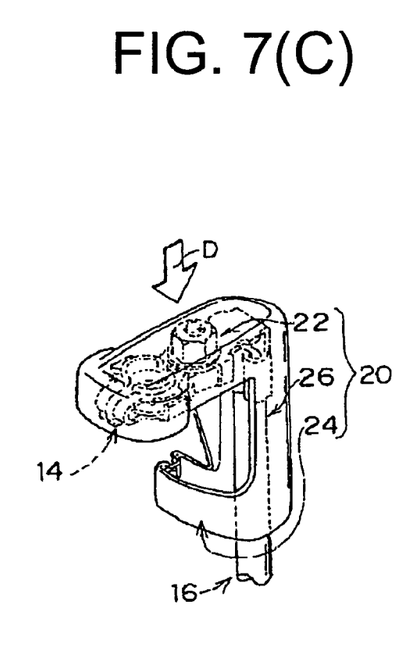
Figure 8:
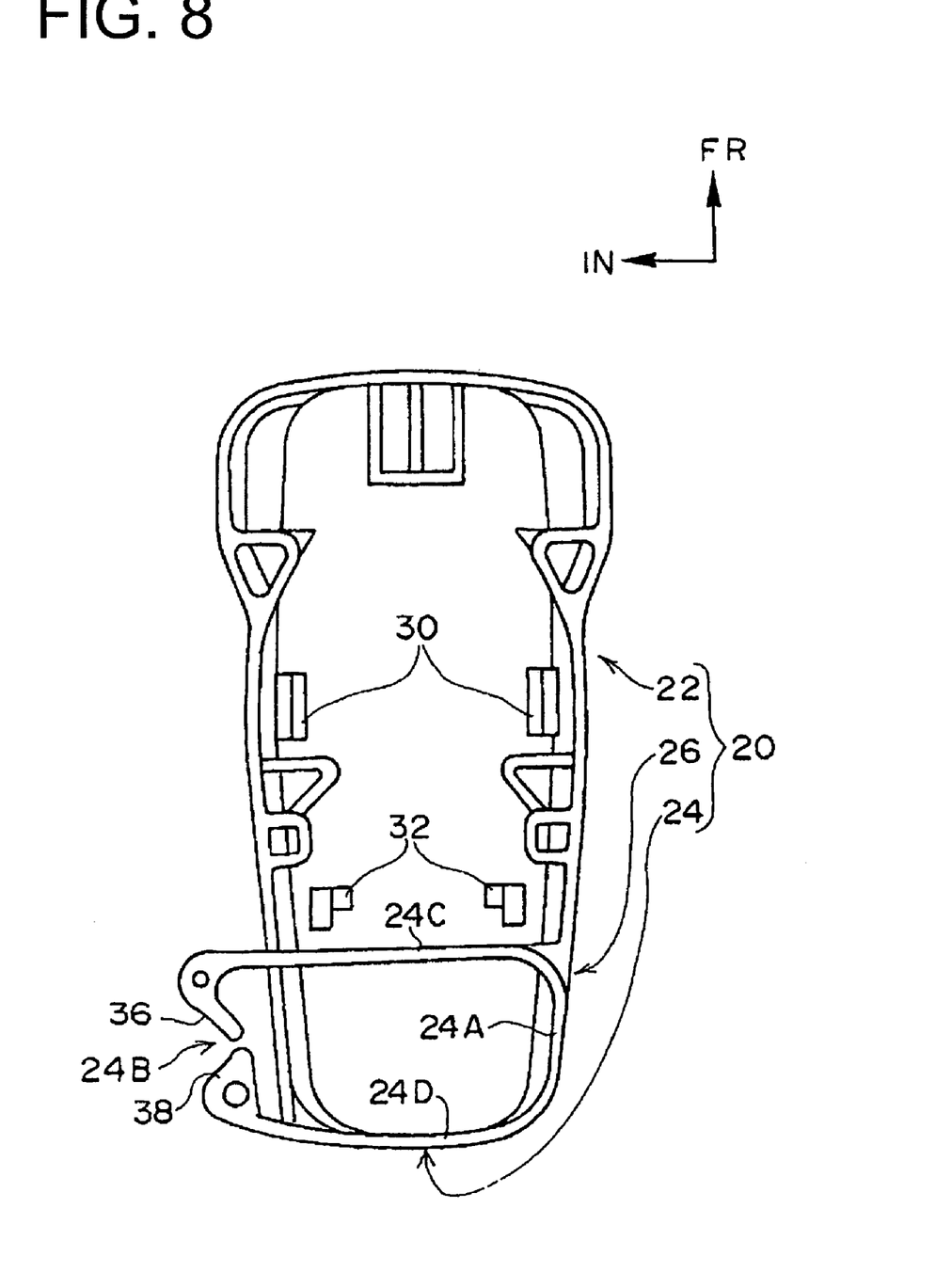
FIG. 8 is a bottom plan view of an alternate embodiment of the battery positive cover.

In the embodiment, shown in FIGS. 7A and 7B, the battery positive cover 20 is moved in the direction shown by the arrow C from the outer side toward the inner side in the width direction of the vehicle body with respect to the battery terminal 14 and the wire harness 16 to place the wire harness-mounting part 24 in the closed state. Thereafter as shown in FIG. 7C, the battery positive cover 20 then is moved down in the direction shown with the arrow D, as shown in FIG. 7C, with respect to the battery terminal 14 and the wire harness 16. Thus, the operation of mounting the battery positive cover 20 on the battery terminal 14 and the wire harness 16 is completed, it is possible to perform the mounting operation easily in a narrow operation space.

The invention is not limited to the above-described embodiment, and those skilled in the art can make various modifications without departing from the spirit and scope of the invention. For example, in the above-described embodiment, locking means 40 are formed at the tips of the inclined portions 36 and 38 of the wire harness-mounting part 24. However, the locking means 40 need not be formed at the tip of each of the inclined portions 36 and 38 of the wire harness-mounting part 24 of the battery positive cover 20.

In the above-described embodiment, the battery terminal 14 and the battery positive cover 20 are aligned in the front-to-back direction, the vertical direction, and the width direction of the vehicle body, as shown in FIG. 2. However, the position and the alignment of the battery terminal 14 and the battery positive cover 20 are not limited in this respect.

Only the front wall 24C of the wire harness-mounting part 24 of the battery positive cover 20 deforms elastically in the above-described embodiment. However, with reference to FIG. 8, the battery positive cover 20 may be constructed so that a rear wall 24D of the wire harness-mounting part 24 deform elastically or so that both the front and rear walls 24C and 24D deform elastically.

What is claimed is:

1. A battery positive cover comprising:
    a terminal protection part having a closed top, an open bottom and a side wall extending in a top-to-bottom direction for protecting a battery terminal;
    a wire harness-mounting part connected to the terminal protection part and having a back wall aligned substantially parallel to the top-to-bottom direction, first and second side walls extending from the back wall to define a substantially U-shape, an entry between portions of the side walls spaced from the back wall, the side walls being capable of elastically deforming between a holding position for holding a wire harness inside said wire harness-mounting part and an open position for allowing insertion of said wire harness into said wire harness-mounting part; and first and second inclined surfaces formed respectively on said first and second side walls of said wire harness-mounting part and being aligned substantially parallel to the top-to-bottom direction so that said inclined surfaces are engageable from an outer side of said wire harness-mounting part toward an inner side thereof in a direction substantially normal to the top-to-bottom direction for moving said wire harness-mounting part to said open position and allowing said wire harness to enter said wire harness-mounting part.

2. The battery positive cover of claim 1, further comprising a locking means for holding said entry in a closed state.

3. The battery positive cover of claim 1, wherein the battery positive cover is formed integrally from a resinous material.

4. The battery positive cover of claim 3, wherein the resinous material is resiliently deformable.

5. The battery positive cover of claim 3, wherein the entry is in the closed position in an unbiased and undeformed condition of the resinous material.

6. A battery positive cover for protecting a terminal and a portion of a wire harness adjacent the terminal when the terminal is mounted on a battery post of a battery, comprising:
a terminal protection part configured for protecting for the battery post and the terminal mounted thereon;
a connection part extending from the terminal protection part; and
a substantially U-shaped wire harness-mounting part extending from the connection part and having a connecting wall and opposed front and rear walls projecting from the connecting wall, the connecting wall and the opposed front and rear walls having surfaces oriented for alignment substantially parallel to the wire harness, an entry defined between ends of the front and rear walls opposite the connecting wall, inclined projections formed on the front and rear walls at the entry and having surfaces converging towards one another at locations closer to the connecting wall for deflecting the front and rear walls away from one another in response to forces thereon in a direction from the entry towards the connecting wall for allowing insertion of said wire harness into said wire harness-mounting part.

7. The battery positive cover of claim 6, further comprising locking means at positions on the inclined projections spaced from the respective front and rear walls for holding said entry in a closed state.

8. The battery positive cover of claim 6, wherein the battery positive cover is formed integrally from a resinous material.

9. The battery positive cover of claim 8, wherein the resinous material is resiliently deformable.

10. The battery positive cover of claim 9, wherein the entry is substantially in the closed position in an unbiased and undeformed condition of the resinous material.

11. A battery positive cover for protecting a terminal and a portion of a wire harness adjacent the terminal when the terminal is mounted on a battery Post of a battery, comprising:
a terminal protection part configured for Protecting for the battery post and the terminal mounted thereon, wherein the terminal protection part has an open side facing in a first direction;
a connection part extending from the terminal protection part, the connection part having a substantially U-shaped cross-section opening in a second direction substantially perpendicular to the first direction; and
a wire harness-mounting part having a substantially U-shaped cross-section opening in a third direction substantially perpendicular to the first and second directions, the wire harness-mounting part extending from the connection part and having a connecting wall and opposed front and rear walls projecting from the connecting wall, an entry defined between ends of the front and rear walls opposite the connecting wall, inclined projections formed on the front and rear walls at the entry and substantially facing one another, the inclined projections being aligned for deflecting the front and rear walls away from one another in response to forces thereon in a direction from the entry towards the connecting wall for allowing insertion of said wire harness into said wire harness-mounting part.

* * * * *